United States Patent
Chiang

(10) Patent No.: US 11,997,146 B1
(45) Date of Patent: May 28, 2024

(54) IMS RESTORATION TRIGGERED BY RECEIPT OF A MWI OR A TEXT MESSAGE VIA FALLBACK PROTOCOL

(71) Applicant: T-Mobile USA, Inc., Bellevue, WA (US)

(72) Inventor: Hsin Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 298 days.

(21) Appl. No.: 17/479,895

(22) Filed: Sep. 20, 2021

(51) Int. Cl.
*H04L 65/1016* (2022.01)
*H04L 65/1045* (2022.01)
*H04L 65/1073* (2022.01)
*H04L 65/1104* (2022.01)
*H04W 4/14* (2009.01)

(52) U.S. Cl.
CPC ...... *H04L 65/1104* (2022.05); *H04L 65/1016* (2013.01); *H04L 65/1045* (2022.05); *H04L 65/1073* (2013.01); *H04W 4/14* (2013.01)

(58) Field of Classification Search
CPC ............. H04L 65/1104; H04L 65/1016; H04L 65/1045; H04L 65/1073; H04W 4/14

USPC ........................................................ 455/435.1
See application file for complete search history.

(56) References Cited

U.S. PATENT DOCUMENTS

2010/0329243 A1* 12/2010 Buckley .............. H04L 65/1069
370/352
2020/0015128 A1* 1/2020 Stojanovski .......... H04W 76/50

* cited by examiner

*Primary Examiner* — Huy C Ho
(74) *Attorney, Agent, or Firm* — Lee & Hayes, P.C.

(57) ABSTRACT

Internet Protocol Multimedia Subsystem (IMS) restoration for a user equipment (UE) may be automatically triggered in response to the UE receiving a message waiting indicator (MWI) or a text message via a fallback protocol that is used as a backup for a primary protocol for delivering the MWI or the text message. For example, if a UE receives a MWI via Non-Access Stratum (NAS) protocol (where NAS protocol serves as a fallback protocol for Session Initiation Protocol (SIP) to deliver the MWI when IMS-based services are unavailable), an IMS restoration procedure may be triggered for the UE where the UE sends a request to register for one or more services of a telecommunication service provider in an effort to restore IMS-based services for the UE, thereby allowing calls to be subsequently established with the UE.

20 Claims, 4 Drawing Sheets

IMS RESTORATION TRIGGERED BY RECEIPT OF A MWI OR A TEXT MESSAGE VIA FALLBACK PROTOCOL

BACKGROUND

When Internet Protocol Multimedia Subsystem (IMS)-based services are unavailable to a user equipment (UE), such as when the UE has poor coverage at a given geolocation or when a network node(s) has malfunctioned, the UE is unable to receive a call from a caller. In these scenarios, the call may go straight to voicemail instead of the UE alerting the user, such as by ringing to alert the user of an incoming call. If the caller leaves a voicemail, the UE, despite not having IMS-based services, may nevertheless receive a voicemail message waiting indicator (MWI) indicating that someone has left a voicemail for the user of the UE. Such a MWI may be received via Non-Access Stratum (NAS) protocol due to the unavailability of IMS-based services, which utilize Session Initiation Protocol (SIP) as a primary protocol for delivering messages to UEs, such as MWIs. Similarly, even if IMS-based services are unavailable to the UE, the UE may still be able to receive text messages (e.g., Short Message Service (SMS) messages) via NAS protocol as a fallback protocol. In either of these scenarios, the IMS-based service outage may persist for a period of time, and, during this period of time, callers may be unable to establish a call with the UE, especially if the user of the UE is unaware of a MWI or a text message received by the UE, such as when the UE is kept in a purse or a pocket on silent. In view of the foregoing, callers may become frustrated by their calls to a particular user repeatedly going straight to voicemail, and the particular user of the mobile terminating (MT) UE may miss the opportunity to talk to the one or more callers.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
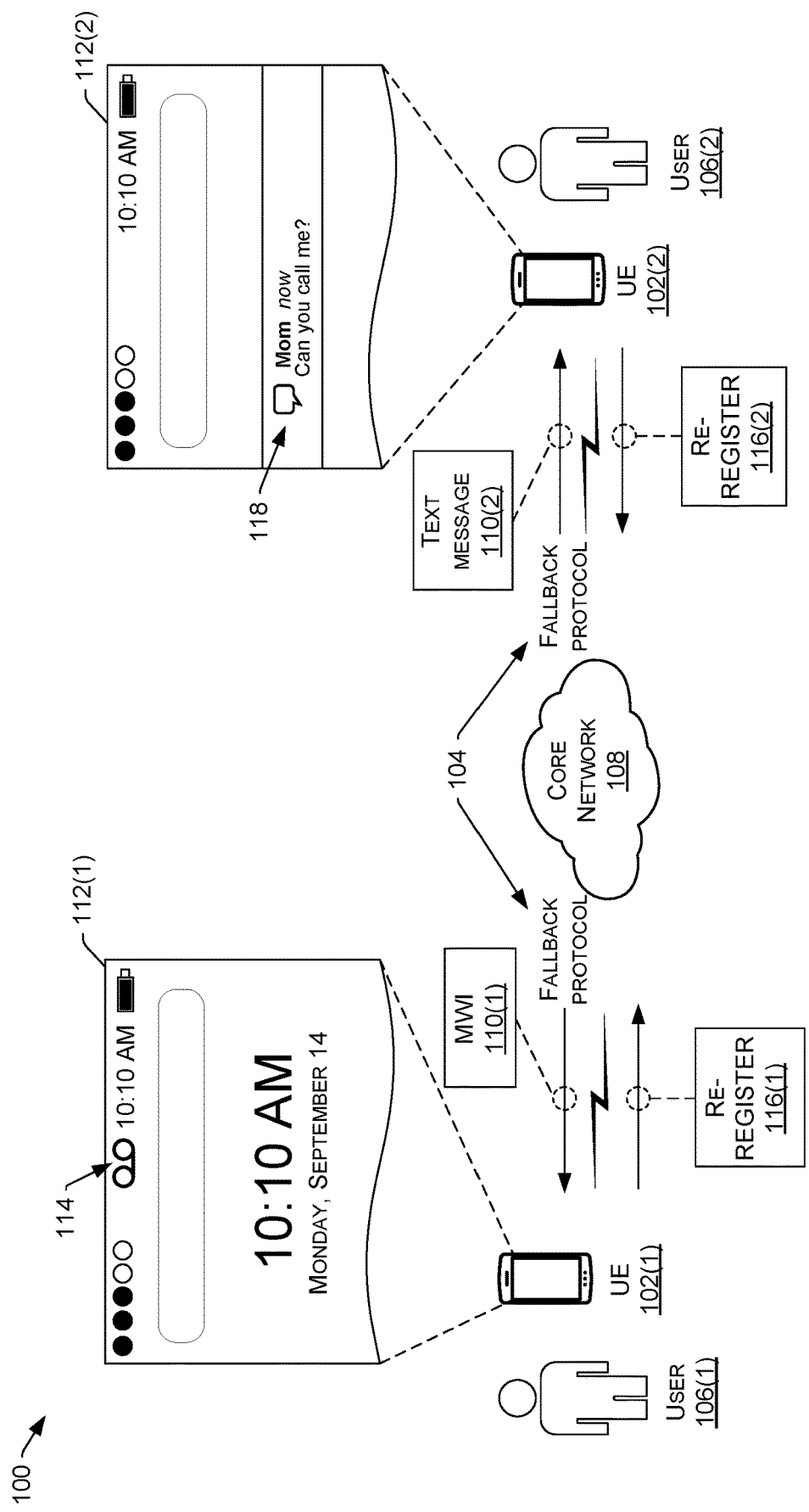
FIG. 1 illustrates an environment depicting techniques for triggering IMS restoration for UEs based on the UEs receiving respective messages via a fallback protocol that is used as a backup for a primary protocol for delivering the respective messages, according to various embodiments.

NAS protocol is used in fifth Generation (5G) systems as a fallback protocol for delivering particular types of messages to UEs when a primary protocol, such as SIP, is not an option for delivering the messages. This means that, even when IMS-based services—such as IMS-based Voice over Internet Protocol (VoIP) service, Short Message Service (SMS) over SIP, and the like—are unavailable to the UE, the UE can still receive a MWI over NAS protocol and/or a text message over NAS protocol. Thus, even if the SIP layer is broken or the UE is otherwise located in a poor-coverage area, and, hence, the UE is unable to receive calls and SMS messages over SIP from other users, NAS protocol is still available (assuming the UE can connect to the telecommunications network) to help deliver, to the UE, basic messages, such as a limited number of bytes of text and MWIs, which can be critical in emergency situations. Nevertheless, the mere existence of NAS protocol as an available fallback protocol does not remedy the underlying issue(s) causing the unavailability of IMS-based services, and, as a result, IMS-based service outages may persist for a period of time notwithstanding the availability of NAS protocol as a fallback protocol.

Described herein are techniques and systems for automatically (e.g., without user intervention) triggering IMS restoration for a UE in response to the UE receiving a MWI or a text message via a fallback protocol that is used as a backup for a primary protocol for delivering the MWI or the text message. For example, if a UE receives a MWI via NAS protocol (where NAS protocol serves as a fallback protocol for SIP to deliver the MWI when IMS-based services are unavailable), an IMS restoration procedure may be triggered for the UE so that IMS-based services (e.g., VoIP, SMS over SIP, etc.) can be restored for the UE, and so that calls can be subsequently established with the UE.

In an illustrative example, a UE initially requests to register for one or more services of a telecommunication service provider via node of a network (e.g., a first proxy call serving control function (P-CSCF) node), and, subsequently, an issue arises that prevents a caller from being able to establish a call with the UE (e.g., the call might go straight to voicemail without ringing at the UE). If the caller leaves a voicemail, the UE may receive a MWI over NAS protocol, which may serve as a backup protocol to SIP for delivering MWIs and other messages (e.g., text messages) to the UE when IMS-based services are unavailable to the UE. In response to the UE receiving the MWI via NAS protocol, the UE may trigger an IMS restoration procedure so that IMS-based services (e.g., VoIP, SMS over SIP, etc.) may be restored for the UE, thereby allowing subsequent calls to be established with the UE and subsequent text messages to be received with rich content (e.g., emojis, Graphics Interchange Format (GIFs), images, videos, etc.) via SIP.

An example IMS restoration procedure may involve the UE sending, to a node of a network, a request to register (e.g., re-register) for one or more services of a telecommunication service provider. For example, the registration request may be sent to the same node to which the UE previously sent a registration request. In other words, the UE may send a "refresh" registration request in an attempt to restore IMS-based services for the UE via the same network pathway. In some examples, IMS restoration may involve traversing through a list of available P-CSCF nodes in an attempt to register via one of those P-CSCF nodes. In some examples, IMS restoration may involve attempting registration via a second, different network than the first network with which the UE previously attempted registration for IMS-based services, such as a network of a roaming partner, a legacy radio network operated by the telecommunication service provider, or the like. In some examples, IMS restoration may involve a combination of these or other approaches performed successively in an attempt to restore IMS connections for the UE. Assuming IMS-based services are restored, the UE may subsequently establish a communication session (e.g., receive an incoming call, receive a SMS message with rich content, etc.), which provides improved network stability and an improved user experience.

Accordingly, as described in more detail below, the delivery of certain types of messages via a fallback protocol (e.g., NAS protocol) can be used as a proxy for determining that IMS-based services (e.g., VoIP, SMS over SIP, etc.) are unavailable to the UE that received the certain type of message via the fallback protocol. This is because the fallback protocol (e.g., NAS protocol) is reserved for instances where a primary protocol (e.g., SIP) used for delivering such messages is unavailable. In other words, based on the delivery method of a MWI or a text message, the UE that receives the MWI or the text message can deduce that something is wrong, which triggers IMS restoration to restore IMS-based services for the UE so that the user can be alerted to subsequent incoming calls and/or so that the UE can receive rich content with text messages (e.g., SMS messages).

An example process to be implemented by a device, such as a UE, can include receiving at least one of a MWI or a text message via a fallback protocol that is used as a backup for a primary protocol for delivering the MWI or the text message, and in response to the receiving of the at least one of the MWI or the text message via the fallback protocol, sending, by the device, to a node of a network, a request to register for one or more services of a telecommunication service provider. Also disclosed herein are systems and devices comprising one or more processors and one or more memories, as well as non-transitory computer-readable media storing computer-executable instructions that, when executed, by one or more processors perform various acts and/or processes disclosed herein.

The techniques, devices, and systems described herein allow for restoring IMS-based services for select UEs in a proactive manner based on the UE receiving a MWI or a text message via a fallback protocol (e.g., NAS protocol) that is not a typical/primary protocol used under normal operating conditions. In this way, a more stable telecommunications network is provided by restoring IMS-based services for UEs so that users can be alerted regarding an incoming call and so that the incoming call can be subsequently established, which can be critical in emergency situations. IMS restoration is also triggered automatically, without user intervention, which allows for restoring IMS-based services for UEs in the background (e.g., when the UEs are not being actively used). In some embodiments, the techniques, devices, and systems described herein may allow one or more devices to conserve resources with respect to processing resources, memory resources, networking resources, power resources, etc., in the various ways described herein. For example, IMS restoration can be performed for select UEs that are in need of IMS-based services, which means that networking resources, among others, are conserved by refraining from performing IMS restoration for other UEs unless and until those UEs receive similar messages via the fallback protocol.

FIG. 1 illustrates an environment 100 depicting techniques for triggering IMS restoration for UEs 102 based on the UEs 102 receiving respective messages via a fallback protocol 104 that is used as a backup for a primary protocol for delivering the respective messages, according to various embodiments. The environment 100 may include a first user equipment (UE) 102(1) used by a first user 106(1), and a second UE 102(2) used by a second user 106(2). These two UEs 102(1), 102(2) and two users 106(1), 106(2) are depicted in the environment 100 of FIG. 1 to illustrate two different types of messages that may trigger IMS restoration for the respective UEs 102.

In accordance with various embodiments described herein, the terms "user equipment (UE)," "wireless communication device," "wireless device," "communication device," "mobile device," "client device," "computing device," "electronic device," "user device," and "device" may be used interchangeably herein to describe any UE (e.g., the UEs 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UNITS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, Voice over LTE (VoLTE)— e.g., fourth Generation (4G), voice over New Radio (VoNR)—e.g., 5G, IEEE 802.1x protocols, WiMAX, Wi-Fi, Data Over Cable Service Interface Specification (DOCSIS), digital subscriber line (DSL), and/or any future Internet Protocol (IP)-based network technology or evolution of an existing IP-based network technology. The UEs 102 may be implemented as any suitable type of computing device configured to communicate over a wireless network, including, without limitation, a mobile phone (e.g., a smart phone/handset), a tablet computer, a laptop computer, a portable digital assistant (PDA), a wearable computer (e.g., electronic/smart glasses, a smart watch, fitness trackers, head-mounted display (HIVED), etc.), an in-vehicle (e.g., in-car) computer, and/or any similar mobile device, as well as situated computing devices including, without limitation, a television (smart television), set-top-box (STB), desktop computer, and the like.

In general, the users 106 can utilize their UEs 102 to communicate with other computing devices of a telecommunications network, such as via a core network 108, as illustrated in FIG. 1. The core network 108 of FIG. 1 may represent an IMS core network, sometimes referred to herein as "IMS core," "IMS network," "Core Network (CN)," or "IM CN Subsystem". The IMS core is an architectural framework defined by the 3$^{rd}$ generation partnership project (3GPP) for delivering IP multimedia to a UE, such as the UEs 102. The IMS core can be maintained and/or operated by one or more service providers, such as one or more telecommunication service providers (or, "wireless carriers," "operators," etc.), that provide IMS-based services to users 106 (sometimes called "subscribers") who are associated with UEs, such as the UEs 102. For example, a service provider may offer multimedia telephony services that allow a subscribed user to call or message other users via an IMS core using his/her UE. A user can also utilize an associated UE to receive, provide, or otherwise interact with various different IMS-based services by accessing computing devices of an IMS core. In this manner, an operator of an IMS core may offer any type of IMS-based service, such as, telephony services, emergency services (e.g., E911), gaming services, instant messaging services, presence services, video conferencing services, social networking and sharing services, location-based services, push-to-talk services, texting services (e.g., SMS), real-time text (RTT) services, web browsing, and so on. In order to access IMS-based services, a UE 102 is configured to request establishment of a communication session. In the case of telephony services, the communication session can comprise a call (i.e., a voice-based communication session, such as a VoIP call).

The UEs 102 are each configured to utilize various access networks, including radio access networks (RANs) and/or radio access technologies (RATs), in order to access certain network nodes of the core network 108. UEs that are 5G NR-compliant may be configured to communicate with heterogeneous cellular networks by employing radios that can communicate over 5G systems (or "5G networks") as well as over legacy or predecessor systems (or "legacy networks") relative to 5G systems. Similarly, UEs that are 4G LTE-compliant may be configured to communicate within heterogeneous cellular networks by employing radios that can communicate over LTE systems (or "LTE networks") as well as over legacy or predecessor systems (or "legacy networks") relative to 4G systems. Today's legacy networks, such as 3G and 2G networks, may employ circuit-switching for voice communications, while 5G and 4G networks employ packet-switching for both data and voice communications in an all-IP data transport technology. In general, 4G LTE-compliant UEs and 5G NR-compliant UEs are configured to prefer attachment to corresponding networks, which offer relatively high data-rate throughput as compared to available legacy or predecessor networks. In most UEs, a choice of which protocol to employ depends primarily on what networks are available to the UE at the UE's present geographic location. Furthermore, in instances where the preferred network (e.g., 4G, 5G, etc.) is unavailable or unusable for any reason, legacy networks, if available, may be used as a fallback, such as by using a circuit-switch fallback (CSFB) mechanism. The UEs 102 of FIG. 1 can comprise a UE with such capabilities to allow for communication over any type of telecommunications network. Accordingly, in the case of 5G NR-compliant UEs, the core network 108 may, in some examples, include network nodes of a 5G system (5GS), such as a policy control function (PCF), a session management function (SMF), an access and mobility management function (AMF), an authentication server function (AUSF), and the like. Accordingly, the UEs 102 may be configured to access such network nodes via a gNodeB of an available 5G NR RAN.

As used herein, a "request" is a message that is sent from a UE 102 to a network node of the core network 108, and a "response" is a message that is sent from a network node of the core network 108 to a UE 102. This construct may be used when discussing communications that use any particular signaling protocol, SIP being one example protocol that can be used to send requests and receive responses (e.g., for transmitting messages to/from a network node of the core network 108), NAS protocol being another example protocol. Accordingly, a "SIP request" is a message that is sent from a UE 102 the core network 108 using SIP, and a "SIP response" is a message that is sent from the core network 108 to a UE 102 using SIP.

SIP is a signaling protocol that can be used to establish, modify, and terminate multimedia sessions (e.g., a multimedia telephony call) over packet networks, and to authenticate access to IMS-based services. Accordingly, during IMS registration, a UE 102 may send a SIP request (e.g., a registration request) using the SIP REGISTER method as part of the initial procedures for registering for IMS-based services. Also, for a UE 102 that is successful in registering for IMS-based services, SIP is used as a primary protocol (e.g., signaling protocol) for delivering certain types of messages including, without limitation, MWIs, text messages (e.g., SMS messages), and the like. Because SIP is a primary protocol, it is somewhat anomalous for a UE 102 to receive certain types of messages including, without limitation, MWIs, text messages (e.g., SMS messages), and the like, using a non-SIP protocol, such as NAS protocol. That being said, NAS protocol is usable as a fallback protocol to SIP for delivering MWIs, text messages (e.g., SMS messages), and the like, to UEs 102 in instances where the SIP layer is "broken" or not properly functioning. This may be the case with a malfunctioning network node(s), or it could even occur when the UE 102 is in a poor coverage area where relatively-large data packets transmitted using SIP may result in dropped packets due to poor radio conditions.

FIG. 1 illustrates that the first UE 102(1) receives a MWI 110(1) via a fallback protocol 104, such as NAS protocol. In some examples, the MWI 110(1) may be received by the first UE 102(1) via an event-based notification (e.g., SMS). In other examples, the MWI 110(1) may be received by the first UE 102(1) via a subscription-based notification, or another type of notification. The MWI 110(1) may be an indicator indicating that someone has left a new voicemail for the user 106(1). FIG. 1 depicts an example user interface (UI) 112(1) presented on a display of the UE 102(1) after the UE 102(1) receives the MWI 110(1). The UI 112(1) presents a visual voicemail indicator 114 on the display of the UE 102(1) to provide a notification to the user 106(1) that the new voicemail has been left for the user 106(1). Additional or alternative notifications may be output by the UE 102(1), such as an audible notification, a vibratory notification, etc. In this example, another user may have called the user 106(1) and left a voicemail, and a voicemail server may have caused the MWI 110(1) to be sent to the UE 102(1). Receipt of the MWI 110(1) causes the voicemail indicator 114 to be presented on the display of the UE 102(1). Under normal circumstances, the MWI 110(1) would be sent using a primary protocol, such as SIP. However, when the MWI 110(1) is delivered via the fallback protocol 104 (e.g., NAS protocol), as depicted in the example of FIG. 1, this delivery method may be used by the UE 102(1) as a proxy for determining, or otherwise deducing, that IMS-based services (e.g., VoIP, SMS over SIP, etc.) are currently unavailable to the UE 102(1). This is based on the notion that using the fallback protocol 104 (e.g., NAS protocol) to deliver MWIs, such as the MWI 110(1), is reserved for instances where the primary protocol (e.g., SIP) is unavailable to do so.

Accordingly, in response to the UE 102(1) receiving the MWI 110(1) via the fallback protocol 104, the UE 102(1) may send, to a node of a network (e.g., the core network 108), a request 116(1) to register for one or more services (e.g., IMS-based services) of a telecommunication service provider. If the UE 102(1) was previously registered for the one or more services, but the service(s) subsequently became unavailable, this request 116(1) may be considered a re-registration, as indicated in FIG. 1. In any case, the registration request 116(1) may be sent by the UE 102(1) as part of an IMS restoration procedure to restore IMS connections that allow the UE 102(1) to access IMS-based services via the core network 108, such as mobile telephony service (e.g., VoIP), SMS services, or the like. These IMS-based services use SIP as a primary protocol for the transmission of messages to/from the UE 102(1). In other words, the receipt of the MWI 110(1) via the fallback protocol 104 may trigger IMS restoration for the UE 102(1), which may involve sending the registration request 116(1) to the core network 108 to restore access to IMS-based services and for the utilization of a primary protocol (e.g., SIP) thereafter.

In the second example of FIG. 1, the second UE 102(2) receives a text message 110(2) via a fallback protocol 104, such as NAS protocol. The text message 110(2) may be a SMS message that includes text. FIG. 1 depicts an example UI 112(2) presented on a display of the UE 102(2) after the UE 102(2) receives the text message 110(2). The UI 112(2) presents a visual text message notification 118 on the display of the UE 102(2) to provide a notification to the user 106(2) that the new text message 110(2) has been received. Additional or alternative notifications may be output by the UE 102(2), such as an audible notification, a vibratory notification, etc. In this example, another user may have sent the text message 110(2) to the user 106(2), causing the text message notification 118 to be presented on the display of the UE 102(2). Under normal circumstances, the text message 110(2) would be sent using a primary protocol, such as SIP. However, when the text message 110(2) is delivered via the fallback protocol 104 (e.g., NAS protocol), as depicted in the example of FIG. 1, this delivery method may be used by the UE 102(2) as a proxy for determining, or otherwise deducing, that IMS-based services (e.g., VoIP, SMS over SIP, etc.) are currently unavailable to the UE 102(2). This, again, is based on the notion that using the fallback protocol 104 (e.g., NAS protocol) to deliver text messages, such as the text message 110(2), is reserved for instances where the primary protocol (e.g., SIP) is unavailable to do so.

Accordingly, in response to the UE 102(2) receiving the text message 110(2) via the fallback protocol 104, the UE 102(2) may send, to a node of a network (e.g., the core network 108), a request 116(2) to register for one or more services (e.g., IMS-based services) of a telecommunication service provider. If the UE 102(2) was previously registered for the one or more services, but the service(s) subsequently became unavailable, this request 116(2) may be considered a re-registration, as indicated in FIG. 1. In any case, the registration request 116(2) may be sent by the UE 102(2) as part of an IMS restoration procedure to restore IMS connections that allow the UE 102(2) to access IMS-based services via the core network 108, such as mobile telephony service (e.g., VoIP), SMS services, or the like. These IMS-based services use SIP as a primary protocol for the transmission of messages to/from the UE 102(2). In other words, the receipt of the text message 110(2) via the fallback protocol 104 may trigger IMS restoration for the UE 102(2), which may involve sending the registration request 116(2) to the core network 108 to restore access to IMS-based services and for the utilization of a primary protocol (e.g., SIP) thereafter.

Prior to IMS restoration, calls made to either of the users' 106(1), 106(2) devices 102(1), 102(2) may have gone straight to voicemail and/or text messages may have been delivered to the devices 102(1), 102(2) via the fallback protocol 104 (e.g., NAS protocol), which may not accommodate sending rich content (e.g., emojis, GIFs, images, videos, etc.) with the text messages. After IMS restoration, calls made to either of the users' 106(1), 106(2) devices 102(1), 102(2) may cause the devices 102(1), 102(2) to alert the users 106(1), 106(2), such as by ringing (e.g., an audible output indicating an incoming call) and/or text messages may be delivered to the devices 102(1), 102(2) via a primary protocol (e.g., SIP), which may allow for delivering rich content (e.g., emojis, GIFs, images, videos, etc.) with the text messages.

Figure 2:
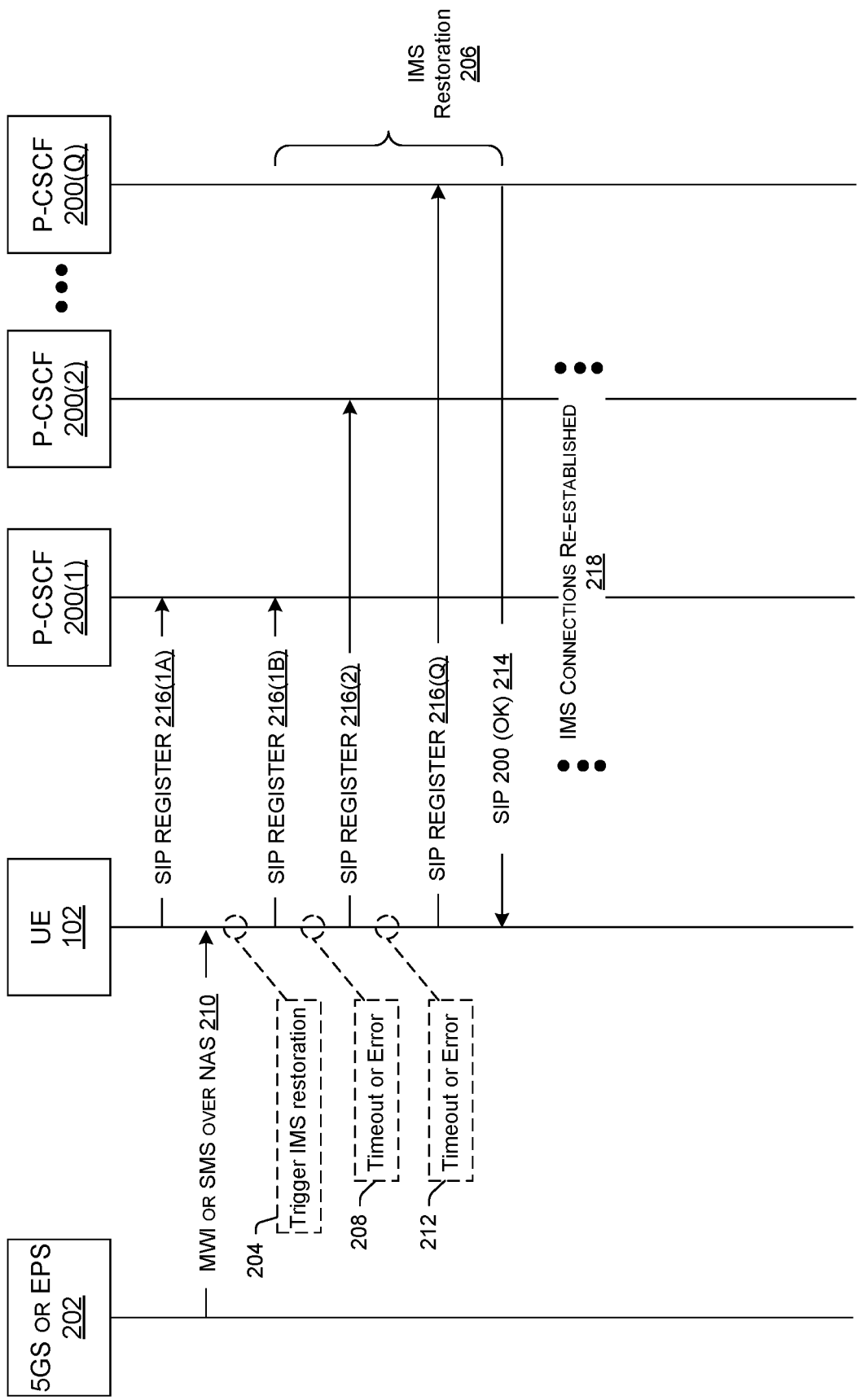
FIG. 2 is a diagram illustrating example signaling between a UE and example nodes of a network(s), as well as a technique for triggering IMS restoration for the UE based on the UE receiving a MWI or a text message via NAS protocol, according to various embodiments.

FIG. 2 is a diagram illustrating example signaling between a UE 102 and example nodes of a network(s), as well as a technique for triggering IMS restoration for the UE 102 based on the UE 102 receiving a MWI or a text message (e.g., SMS message) via NAS protocol, according to various embodiments. It is to be appreciated that the "nodes" depicted in FIG. 2 may in fact represent multiple nodes or a single node. It is also to be appreciated that additional nodes may be utilized in an IMS restoration procedure for the UE 102, even though they are not depicted in FIG. 2, as would be recognized by a person having ordinary skill in the art.

FIG. 2 illustrates that the UE 102 may initially request registration for one or more services of a telecommunication provider (e.g., one or more IMS-based services provided via the IMS core). For example, the UE 102 may identify a P-CSCF node 200(1) of the IMS core, and sending a registration request 216(1A) (or request to register for one or more services) via a RAN to an address of the P-CSCF node 200(1). FIG. 2 depicts a plurality of P-CSCF nodes 200(1) . . . 200(Q) (collectively 200), which may be part of the same network (e.g., 5G network), or which may be part of different networks (e.g., some P-CSCF nodes 200 may be part of a first network, such as a 5G network, and some P-CSCF nodes 200 may be part of a second network, such as a 4G network, and so on and so forth). With respect to the P-CSCF node 200(1), the registration request 216(1A) is the initial (or first) SIP request that starts a first SIP dialogue between the UE 102 and the P-CSCF node 200(1). In the example of FIG. 2, this registration request 216(1A) is in the form of a SIP request using the SIP REGISTER method. It is to be appreciated that registration procedures can include various actions and message transmissions by and between the UE 102 and various network nodes in addition to the registration request 216(1A) depicted in FIG. 2, and that additional registration procedures may be performed during registration, depending on the implementation. In general, any suitable registration procedures known to a person having ordinary still in the art can be implemented, which are performed with the aim of registering the UE 102 for one or more services of a telecommunication service provider. Because network topologies vary between service providing entities, the signaling employed may vary.

In some examples, the UE 102 may be configured to send information regarding its capabilities to a node(s) of the network. The UE 102 may send this information at a time of registration, such as at a time of sending the registration request 216(1A) to the first P-CSCF node 200(1). In the context of the present disclosure, the information regarding the capabilities of the UE 102 may include, without limitation, information indicating that the UE 102 is capable of receiving MWIs and/or text messages (e.g., SMS messages) via a fallback protocol 104, such as NAS protocol. The sending of such capability information to the network may be a prerequisite to the UE 102 receiving a MWI or a text message (e.g., SMS message) via NAS protocol, when NAS protocol is used as a fallback protocol to SIP. In other examples, the UE 102 may not send such capability information to the network, such as when the use of the fallback protocol 104 for delivering certain types of messages (e.g., MWIs, text messages, etc.) is enabled for all UEs across the board.

FIG. 2 further illustrates that the UE 102 receives a MWI or a SMS message 210 via NAS protocol. NAS protocol is an example fallback protocol that is used as a backup for SIP, and SIP is an example primary protocol for delivering the MWI or the SMS message 210. FIG. 2 illustrates that the MWI or the SMS message 210 is received via NAS protocol from a node of a 5GS or an evolved packet system (EPS) 202. EPS is a legacy or predecessor system relative to 5GS. Accordingly, depending on the system or network to which the UE 102 is presently attached, the MWI or the SMS message 210 may be received from a 5GS or from an EPS (either of which is represented by reference numeral 202 in FIG. 2). The receipt, by the UE 102, of the MWI or the SMS message 210 via NAS protocol triggers IMS restoration at 204 for the UE 102. This delivery method (i.e., delivery via NAS protocol) may indicate to the UE 102 that something is amiss because NAS protocol is used as a fallback protocol for delivering the MWI or the SMS message 210. This may occur if the UE 102 is still in the process of registering for the service(s) of the telecommunication service provider at the time of receiving the MWI or the SMS message 210, in which case the UE 102 may have not yet received a response to the registration request 216(1A) indicating a successful registration, such as a 200 (OK) SIP response. Alternatively, the UE 102 may have received a 200 (OK) SIP response after sending the registration request 216(1A), which indicates that the UE 102 successfully registered for services of the telecommunication service provider, but the UE 102 may have subsequently lost access to the IMS-based services for which it was previously registered. In either scenario, a call made by a caller who is trying to reach a user 106 of the UE 102 may have gone straight to voicemail due to an unavailability of IMS VoIP services for the UE 102, which caused a MWI 210 to be delivered to the UE 102 via NAS protocol. Alternatively, another user may have sent a SMS message 210 to the user 106 of the UE 102, and that SMS message 210 may have been delivered over NAS protocol 210 due to the unavailability of IMS texting services, which uses SIP as a primary protocol for delivering text messages, potentially with rich content (e.g., emojis, GIFs, images, videos, etc.).

IMS restoration 206, once it is triggered at 204, may involve the UE 102 sending, to a network node, a request to register for one or more services of the telecommunication service provider in an attempt to restore the UE's 102 access to those services. The example of FIG. 2 illustrates an IMS restoration 206 procedure involving a series of attempts to restore access to IMS-based services for the UE 102. For example, the UE 102 may send another registration request 216(1B) to the same node (e.g., the first P-CSCF node 200(1)) to which the UE 102 previously sent the first registration request 216(1A). This additional registration request 216(1B) may be in the form of a SIP request using the SIP REGISTER method. In other words, the UE 102 may initially send a "refresh" registration request 216(1B) in an attempt to restore IMS-based services for the UE 102 via the same network pathway (e.g., via the same, first P-CSCF node 200(1)). If the UE 102 had not yet attempted registration, such as if the MWI or the SMS message 210 was received via NAS protocol shortly after the UE 102 was powered on and prior to the UE 102 registering for IMS-based services, the registration request 216(1B) may be the first registration attempt that the UE 102 makes, and it may be sent to the first P-CSCF node 200(1).

If a timeout occurs at 208 without the UE 102 having received an expected response (e.g., a 200 (OK) SIP response) from the first P-CSCF node 200(1), or if the UE 102, at 208, receives an error from the first P-CSCF node 200(1), this means that registration (e.g., re-registration) with the first P-CSCF node 200(1) was unsuccessful. In response, the UE 102 may start traversing through a list of available P-CSCF nodes 200 in an attempt to register via one of the other P-CSCF nodes 200 in the list, and, as such, the UE 102 may send a registration request 216(2) to a second, different P-CSCF node 200(2). For example, the UE 102 may send a registration request 216(2) (e.g., a SIP request using the SIP REGISTER method) to the second, different P-CSCF node 200(2) in FIG. 2. In some embodiments, the UE 102 is configured to retry registration as many times as the number of P-CSCF nodes 200 (e.g., "Q" may represent the number of P-CSCF nodes 200) of the IMS core that are available to the UE 102. This means that the UE 102 may learn of the available P-CSCF nodes 200(1)-(Q) in advance of sending the registration request 216(2). For example, at a time before sending the registration request 216(2) to the second P-CSCF node 200(2), the UE 102 may have previously registered with the first P-CSCF node 200(1), and the first P-CSCF node 200(1) may have provided the UE 102 with a packet data network (PDN) connection response that included a list of the P-CSCF nodes 200(1)-(Q) and their corresponding addresses, in order of priority. This is sometimes called a "PCO list" because the UE 102 may initiate a context activation procedure which carries a PCO field with a request for one or more P-CSCF address(es). The P-CSCF addresses representing the P-CSCF nodes 200(1)-(Q) are returned to the UE 102 in this regard. A P-CSCF address may be in the form of an IP address or a fully qualified domain name (FQDN). Although multiple P-CSCF nodes 200(1)-(Q) are depicted in FIG. 2, it is to be appreciated that the number, Q, of P-CSCF nodes 200 provided to the UE 102 can be a single P-CSCF node 200 or multiple P-CSCF nodes 200; in the example of FIG. 2, Q>2. Furthermore, the P-CSCF nodes 200(1)-(Q) shown in FIG. 2 may be part of a common network, such as a 5G NR network.

In response to sending the registration request 216(2), the UE 102 may start a timer and, if another timeout occurs at 212 without the UE 102 having received an expected response (e.g., a 200 (OK) SIP response) from the second P-CSCF node 200(2), or if the UE 102, at 212, receives an error from the second P-CSCF node 200(2), this means that registration (e.g., re-registration) with the second P-CSCF node 200(2) was unsuccessful. In response, the UE 102 may continue traversing through the list of available P-CSCF nodes 200 in an attempt to register via a next one of the P-CSCF nodes 200, and, so on and so forth until the UE 102 sends a registration request 216(Q) to a last P-CSCF node 200(Q) in the list of Q P-CSCF nodes 200(1)-(Q).

In some examples, the IMS restoration 206 procedure involves the UE 102 registering with a different network than a network with which the UE 102 initially attempted registration. In these examples, the first P-CSCF node 200(1) and the second P-CSCF node 200(2) may be part of a common, first network (e.g., a 5G NR network), and the UE 102 may be configured to initially traverse through a list of P-CSCF nodes 200(1)-(2) that are part of the common, first network, and, if the UE 102 is unable to register using a P-CSCF node 200 of the first network, the UE 102 may then reattempt registration on a second network, such as a 4G LTE network, a different legacy network (e.g., 3G/2G), and/or a network of a roaming partner. In this example, the P-CSCF node 200(Q) may represent a node of the second, different network. It is also to be appreciated that the UE 102 may attempt registration via a P-CSCF node 200(Q) of a second, different network without attempting registration via additional P-CSCF nodes 200 of the first network. It is also to be appreciated that the UE 102 may implement any of these approaches individually, or any multiple ones of these approaches in combination (e.g., sequentially).

In the example of FIG. 2, the UE 102 eventually receives a 200 (OK) SIP response 214 from the $Q^{th}$ P-CSCF node 102(Q), which indicates that registration with the $Q^{th}$ P-CSCF node 102(Q) was successful. After receiving the 200 (OK) SIP response, the UE 102 may perform one or more additional procedures 218 to establish (e.g., re-establish) IMS connections so that, among other things, calls can be subsequently received by the UE 102, which can then alert the user 106 of an incoming call, and/or so that text messages can be received by the UE 102 over SIP with rich content (e.g., emojis, GIFs, images, videos, etc.).

Registration procedures and session setup procedures for a given communication session may vary by implementation, session type (e.g., phone call verses video conference, emergency verses non-emergency call, etc.), attachment result (e.g., combined attached verses not combined attached), network topology, and/or other factors. Accordingly, detailed and exhaustive examples of procedures and the order in which they are performed in order to register for IMS-based services and to setup a communication session are not described herein, as the various possible setup procedures are generally known to a person having ordinary skill in the art. As such, any given registration and/or session setup may include some or all of the example procedures described herein, performed in a suitable order.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
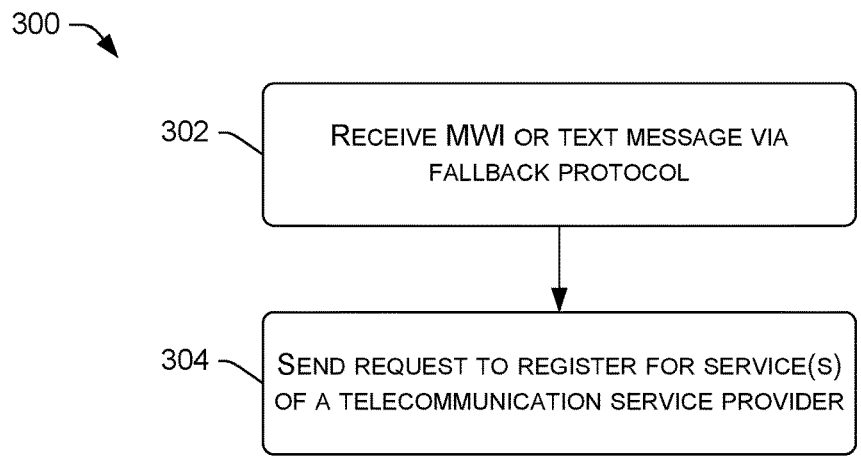
FIG. 3 illustrates a flowchart of an example process for triggering IMS restoration for a UE based on the UE receiving a MWI or a text message via a fallback protocol, according to various embodiments.

FIG. 3 illustrates a flowchart of an example process 300 for triggering IMS restoration for a device (e.g., a UE 102) based on device (e.g., the UE 102) receiving a MWI or a text message via a fallback protocol, according to various embodiments. The process 300 is described with reference to the previous figures.

At 302, a device (e.g., a UE 102) may receive at least one of a MWI or a text message via a fallback protocol 104 that is used as a backup for a primary protocol for delivering the MWI or the text message. The fallback protocol 104 may be NAS protocol, whereas the primary protocol may be SIP. The MWI 110(1) may serve as an indicator indicating that someone has left a new voicemail for a user 106 of the device 102. The text message 110(2) may be in the form of a SMS message. In either scenario, the device 102 may be configured to output a notification of the received MWI or text message (e.g., a visual voicemail indicator 114 or a visual text message indicator 118 presented on a display of the device 102, an audible indicator, and/or a vibratory/haptic indicator).

At 304, in response to the device 102 receiving the at least one of the MWI or the text message via the fallback protocol 104, the device (e.g., the UE 102) may send, to a node of a network, a request to register for one or more services of a telecommunication service provider. The request sent at block 304 may be a request to register for one or more IMS-based services. In an example, the request sent at block 304 is a SIP request using the SIP REGISTER method. Furthermore, the request sent at block 304 is sent without user intervention in response to the receiving of the at least one of the MWI or the text message via the fallback protocol 104 at block 302. In an example, the node to which the request is sent at block 304 is a P-CSCF node 200. The request sent at block 304 may be sent as part of an IMS restoration 206 procedure. Accordingly, the request sent at block 304 may represent a refresh registration that is sent to a same node to which the device 102 previously sent a registration request. Alternatively, the request sent at block 304 may represent a registration request that is sent to a different node (e.g., a different P-CSCF node 200) in the same network (e.g., a different P-CSCF node 200 in a list of P-CSCF nodes). Alternatively, the request sent at block 304 may represent a registration request that is sent to a node of a different network, such as a node of a 4G LTE network where the device 102 had previously attempted registration in a 5G network. In any case, the request sent at block 304 is an attempt to restore IMS connections to provide the device 102 with access to IMS-based services. The device 102 having access to IMS-based services allows the device 102 to receive a message associated with an incoming call and to alert the user 106 of the device 102 as to the incoming call so that the user 106 may answer the call. Without the IMS restoration, an issue that renders IMS-based services unavailable to the device 102 may otherwise persist for a period of time, and such a call may go straight to voicemail. Thus, the process 300 provides a more stable network and an improved user experience.

Figure 4:
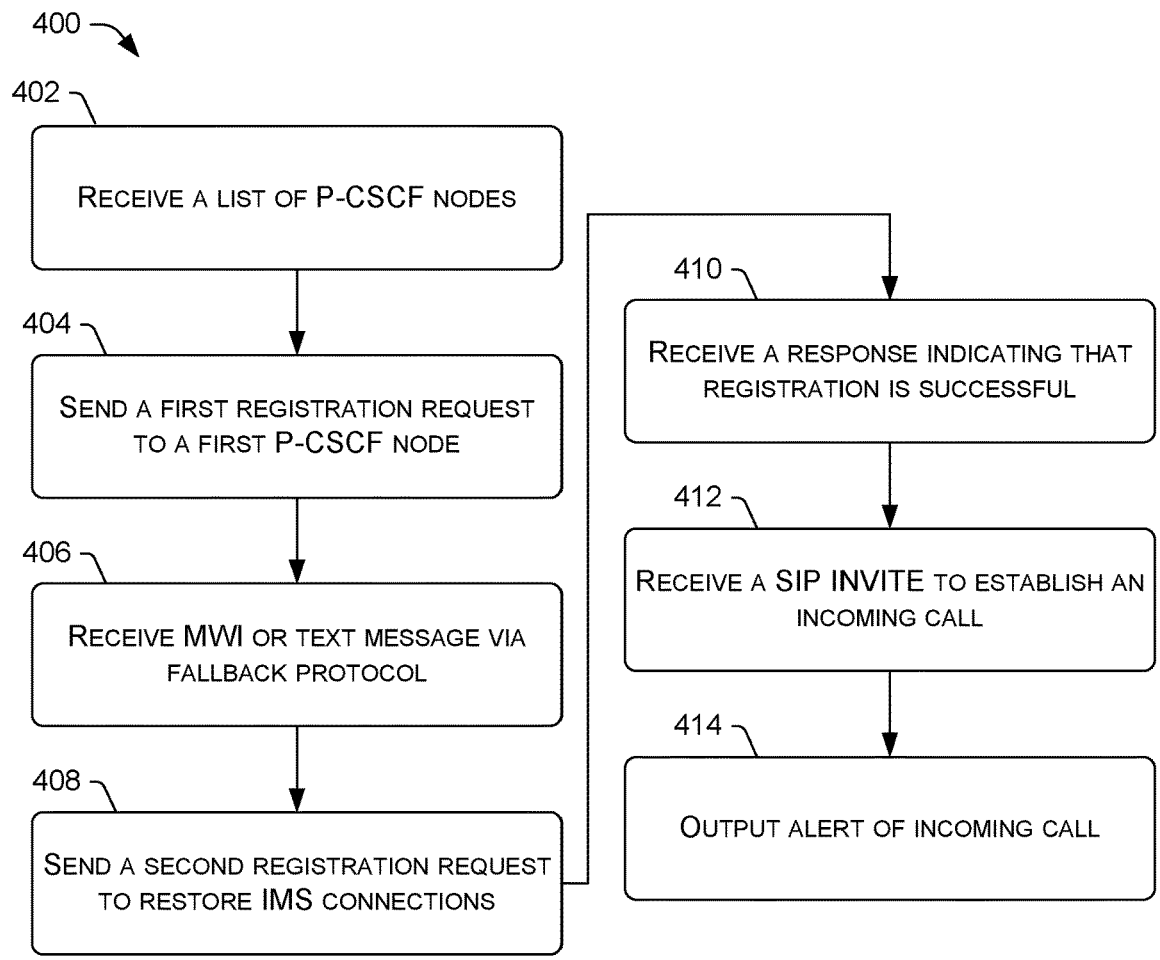
FIG. 4 illustrates a flowchart of an example process for triggering IMS restoration for a UE and subsequently outputting an alert indicative of an incoming call, according to various embodiments.

FIG. 4 illustrates a flowchart of an example process 400 for triggering IMS restoration for a device (e.g., a UE 102) and subsequently outputting an alert indicative of an incoming call, according to various embodiments. The process 400 is described with reference to the previous figures.

At 402, a device (e.g., a UE 102) may receive a list of P-CSCF nodes 200, the list including at least a first P-CSCF node 200(1) and a second P-CSCF node 102(2). For example, the device 102, as part of a registration procedure, may receive a PDN connection response that includes a list (e.g., a PCO list) of the P-CSCF nodes 200(1), 200(2), etc., and their corresponding addresses, in order of priority. The P-CSCF addresses representing the P-CSCF nodes 200 may be in the form of an IP address or a FQDN. The P-CSCF nodes 200 in the list may be associated with a first, common network, such as a 5G NR network.

At 404, the device (e.g., the UE 102) may send, to the first P-CSCF node 200(1) in the list, a first request 216(1A) to register for one or more services of a telecommunication service provider. The first request 216(1A) sent at block 404 may be a request to register for one or more IMS-based services. In an example, the first request 216(1A) sent at block 404 is a SIP request using the SIP REGISTER method.

At 406, the device (e.g., the UE 102) may receive at least one of a MWI or a text message via a fallback protocol 104 that is used as a backup for a primary protocol for delivering the MWI or the text message. The fallback protocol 104 may be NAS protocol, whereas the primary protocol may be SIP. The MWI 110(1) may serve as an indicator indicating that someone has left a new voicemail for a user 106 of the device 102. The text message 110(2) may be in the form of a SMS message. In either scenario, the device 102 may be configured to output a notification of the received MWI or text message (e.g., a visual voicemail indicator 114 or a visual text message indicator 118 presented on a display of the device 102, an audible indicator, and/or a vibratory/haptic indicator).

At 408, in response to the device 102 receiving the at least one of the MWI or the text message via the fallback protocol 104, the device (e.g., the UE 102) may send a second request to register for one or more services of a telecommunication service provider. The second request sent at block 408 may be a request to register for one or more IMS-based services. In an example, the second request sent at block 408 is a SIP request using the SIP REGISTER method. Furthermore, the second request sent at block 408 is sent without user intervention in response to the receiving of the at least one of the MWI or the text message via the fallback protocol 104 at block 406. In an example, the second request sent at block 408 is sent to the first P-CSCF node 200(1) in the list of P-CSCF nodes 200. That is, the second request sent at block 408 may represent a refresh registration 216(1B) sent to a same node to which the device 102 previously sent the first registration request 216(1A) at block 404. Alternatively, the second request sent at block 408 may represent a registration request 216(2) that is sent to a different node (e.g., a different P-CSCF node 200) in the same network (e.g., the second P-CSCF node 200(2) in the list of P-CSCF nodes 200). Alternatively, the second request sent at block 408 may represent a registration request 216(Q) that is sent to a node of a different network, such as a node (e.g., a P-CSCF node 200(Q)) of a 4G LTE network where the device 102 had previously attempted registration in a 5G network. In any case, the second request sent at block 408 is an attempt to restore IMS connections to provide the device 102 with access to IMS-based services. It is to be appreciated that, in some examples, the device 102 may be configured to implement a series of registration attempts, one after another, in an attempt to restore IMS connections. As such, the device 102 may send multiple registration requests, including the registration request sent at block 408, until registration for the service(s) is successful, or until the device 102 has exhausted the available options for restoring access to IMS-based services without success. The process 400 is an example where registration eventually succeeds at block 410.

At 410, the device (e.g., the UE 102) may receive a response to the second request indicating that registration for the one or more services is successful. The response indicating successful registration may be received at block 410 from the network node to which the second registration request was sent at block 408. For example, the response received at block 410 may be received from the first P-CSCF node 200(1) in an example where a refresh registration was effective for restoring IMS connections for the device 102. In another example, the response received at block 410 may be received from a different (e.g., second) P-CSCF node 200 in the list of P-CSCF nodes 200 that was received at block 402. This may be the case where there is an issue preventing successful IMS registration via the first P-CSCF node 200(1) in the list. As yet another example, the response received at block 410 may be received from a node (e.g., a P-CSCF node 200) of a different network, such as a node of a legacy network, a network of a roaming partner, or the like.

At 412, the device (e.g., the UE 102) may receive a SIP message using a SIP INVITE method. The SIP message received at block 412 may be associated with an incoming call to the device 102. Accordingly, the device 102 may be considered a MT device.

At 414, the device (e.g., the UE 102) may output, based on the receiving of the SIP message using the SIP INVITE method at block 412, an alert indicative of an incoming call. The alert output at block 414 may be an audible and/or vibratory/haptic ringing alert. Additionally or alternatively, the alert may be a visual alert presented on a display of the device 102, such as an incoming call alert presented on the display. The type of alert output via the device 102 may depend on user settings pertaining to incoming call alerts. That is, if the user 106 set the device 102 to "silent", the alert output at block 414 may be a visual alert presented on a display, a flashing light(s), etc., without also outputting an audible alert and/or a vibratory/haptic alert.

In this manner, the IMS restoration performed at blocks 408-410, which is triggered by the receipt of the MWI or the text message via the fallback protocol 104 at block 406, allows for restoring IMS connections for the device 102, which, in turn, allows the device 102 to receive a message associated with an incoming call and to alert the user 106 of the device 102 as to the incoming call so that the user 106 may answer the call. Without the IMS restoration, an issue that renders IMS-based services unavailable to the device 102 may otherwise persist for a period of time, and such a call may go straight to voicemail. Thus, the process 400 provides a more stable network and an improved user experience.

Figure 5:
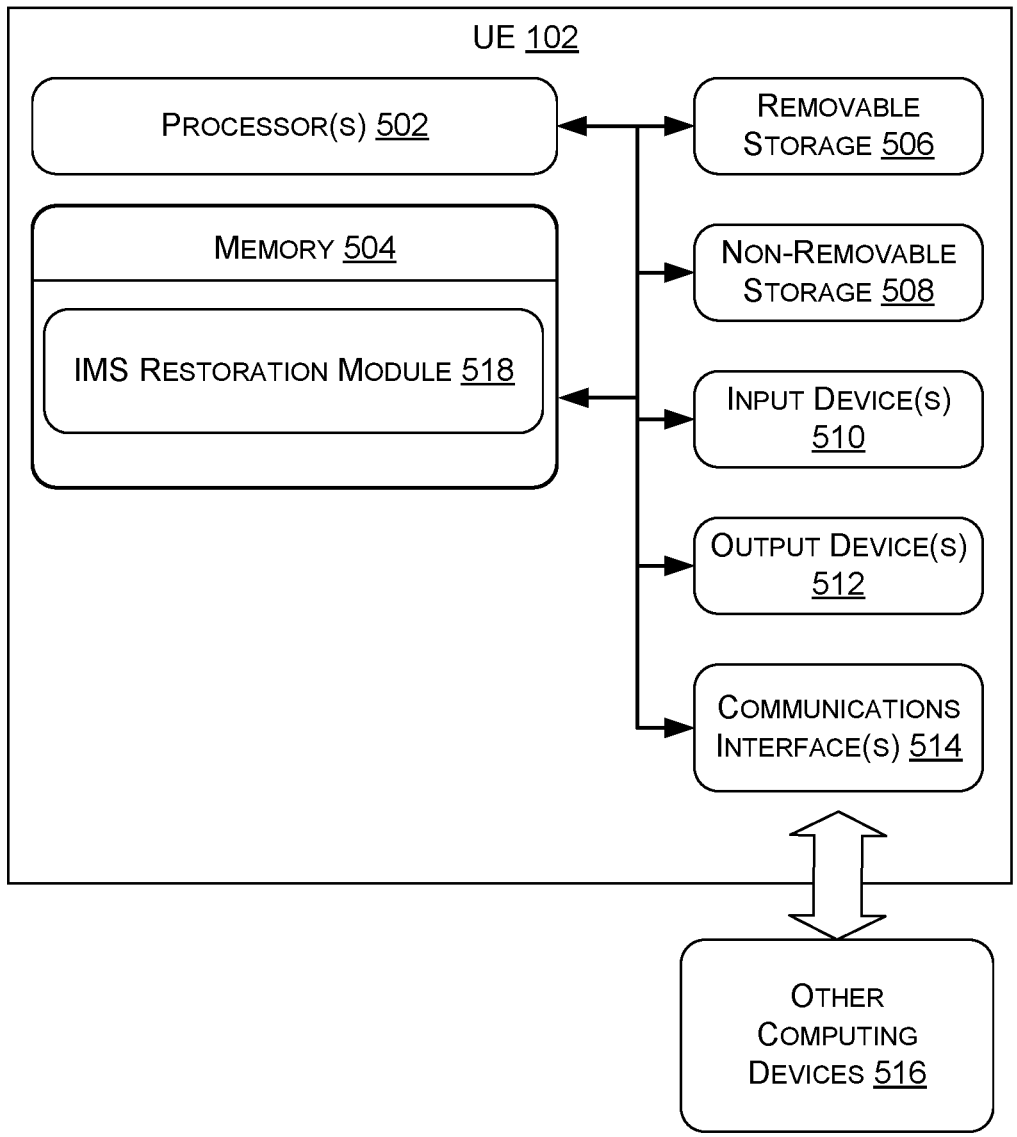
FIG. 5 is a block diagram of an example UE with logic to implement the IMS restoration procedure(s) described herein, according to various embodiments.

FIG. 5 is a block diagram of an example UE 102 with logic to implement the IMS restoration procedure(s) described herein, according to various embodiments. As shown, the UE 102 may include one or more processors 502 and one or more forms of computer-readable memory 504. The UE 102 may also include additional storage devices. Such additional storage may include removable storage 506 and/or non-removable storage 508.

The UE 102 may further include input devices 510 (e.g., a touch screen, keypad, keyboard, mouse, pointer, microphone, etc.) and output devices 512 (e.g., a display, printer, speaker, etc.) communicatively coupled to the processor(s) 502 and the computer-readable memory 504. The UE 102 may further include communications interface(s) 514 that allow the UE 102 to communicate with other computing devices 516 (e.g., IMS nodes) such as via a network (e.g., the IMS core, the P-CSCF nodes 200, nodes of a 5GS or EPS 202, etc.). The communications interface(s) 514 may facilitate transmitting and receiving wired and/or wireless signals over any suitable communications/data technology, standard, or protocol, as described herein. For example, the communications interface(s) 514 can comprise one or more of a cellular radio, a wireless (e.g., IEEE 802.1x-based) interface, a Bluetooth® interface, and so on. In some embodiments, the communications interface(s) 514 may include radio frequency (RF) circuitry that allows the UE 102 to transition between different RATs, such as transitioning between communication with a 5G NR RAT, a 4G LTE RAT and other legacy RATs (e.g., 3G/2G). The communications interface(s) 514 may further enable the UE 102 to communicate over circuit-switch domains and/or packet-switch domains.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 102. Any such computer-readable storage media may be part of the UE 102.

The memory 504 can include an IMS restoration module 518 (i.e., computer-executable instructions (or logic) that, when executed, by the processor(s) 502, perform the various acts and/or processes disclosed herein). For example, the IMS restoration module 518 can be configured to carry out the IMS restoration procedures described herein, such as an IMS restoration procedure(s) to restore IMS connections in response to receiving a MWI or a text message via a fallback protocol 104.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

I claim:

1. A user equipment (UE) comprising:
a processor; and
memory storing computer-executable instructions that, when executed by the processor, cause the device to:
receive at least one of a message waiting indicator (MWI) or a Short Message Service (SMS) message via Non-Access Stratum (NAS) protocol, the at least one of the MWI or the SMS message sent to trigger an Internet Protocol Multimedia Subsystem (IMS) restoration procedure; and
in response to receiving the at least one of the MWI or the SMS message via the NAS protocol, send, to a node of a network, as part of the IMS restoration procedure, a request to register for one or more IMS-based services of a telecommunication service provider.

2. The UE of claim 1, wherein sending the request to register for the one or more IMS-based services is performed without user intervention in response to the receiving of the at least one of the MWI or the SMS message via the NAS protocol.

3. The UE of claim 1, wherein the computer-executable instructions, when executed by the processor, further cause the device to:
receive, from the node, a response to the request indicating that registration for the one or more IMS-based services is successful;
receive a Session Initiation Protocol (SIP) message using a SIP INVITE method; and
output, based on receiving the SIP message using the SIP INVITE method, an alert indicative of an incoming call.

4. The UE of claim 1, wherein:
the node is a proxy call session control function (P-CSCF) node;
the request to register for the one or more IMS-based services is a second Session Initiation Protocol (SIP) request using a SIP REGISTER method;
the computer-executable instructions, when executed by the processor, further cause the device to, prior to receiving the at least one of the MWI or the SMS message via the NAS protocol, send, to the P-CSCF node, a first SIP request using the SIP REGISTER method.

5. A method comprising:
receiving, by a user equipment (UE), at least one of a message waiting indicator (MWI) or a text message via a fallback protocol that is used as a backup for a primary protocol for delivering the MWI or the text message, the at least one of the MWI or the text message sent to trigger an Internet Protocol Multimedia Subsystem (IMS) restoration procedure; and
in response to the receiving of the at least one of the MWI or the text message via the fallback protocol, sending, by the UE, to a node of a network, as part of the IMS restoration procedure, a request to register for one or more services of a telecommunication service provider.

6. The method of claim 5, wherein:
the fallback protocol comprises Non-Access Stratum (NAS) protocol; and
the primary protocol comprises Session Initiation Protocol (SIP).

7. The method of claim 5, wherein the text message comprises a Short Message Service (SMS) message.

8. The method of claim 5, wherein the sending of the request to register for the one or more services is performed without user intervention in response to the receiving of the at least one of the MWI or the text message via the fallback protocol.

9. The method of claim 5, further comprising:
receiving, by the device, from the node, a response to the request indicating that registration for the one or more services is successful;
receiving, by the device, a Session Initiation Protocol (SIP) message using a SIP INVITE method; and outputting, by the device, and based on the receiving of the SIP message using the SIP INVITE method, an alert indicative of an incoming call.

10. The method of claim 5, wherein:
the request to register for the one or more services is a second request; and
the method further comprises, prior to the receiving of the at least one of the MWI or the text message via the fallback protocol, sending, by the device, to the node, a first request to register for the one or more services.

11. The method of claim 10, wherein:
the node is a proxy call session control function (P-CSCF) node;
the first request is a first Session Initiation Protocol (SIP) request using a SIP REGISTER method; and
the second request is a second SIP request using the SIP REGISTER method.

12. The method of claim 5, wherein:
the request to register for the one or more services is a second request;
the method further comprises, prior to the receiving of the at least one of the MWI or the text message via the fallback protocol:
  receiving, by the device, a list of proxy call session control function (P-CSCF) nodes including at least a first P-CSCF node and a second P-CSCF node; and
  sending, by the device, to the first P-CSCF node, a first request to register for the one or more services; and
the node is the second P-CSCF node.

13. A user equipment (UE) comprising:
a processor; and
memory storing computer-executable instructions that, when executed by the processor, cause the device to:
  receive at least one of a message waiting indicator (MWI) or a text message via a fallback protocol that is used as a backup for a primary protocol for delivering the MWI or the text message, the at least one of the MWI or the SMS message sent to trigger an Internet Protocol Multimedia Subsystem (IMS) restoration procedure; and
  in response to receiving the at least one of the MWI or the text message via the fallback protocol, send, to a node of a network, as part of the IMS restoration procedure, a request to register for one or more services of a telecommunication service provider.

14. The UE of claim 13, wherein:
the fallback protocol comprises Non-Access Stratum (NAS) protocol; and
the primary protocol comprises Session Initiation Protocol (SIP).

15. The UE of claim 13, wherein the text message comprises a Short Message Service (SMS) message.

16. The UE of claim 13, wherein sending the request to register for the one or more services is performed without user intervention in response to the receiving of the at least one of the MWI or the text message via the fallback protocol.

17. The UE of claim 13, wherein the computer-executable instructions, when executed by the processor, further cause the device to:
  receive, from the node, a response to the request indicating that registration for the one or more services is successful;
  receive a Session Initiation Protocol (SIP) message using a SIP INVITE method; and
  output, based on the receiving of the SIP message using the SIP INVITE method, an alert indicative of an incoming call.

18. The UE of claim 13, wherein:
the request to register for the one or more services is a second request; and
the computer-executable instructions, when executed by the processor, further cause the device to, prior to receiving the at least one of the MWI or the text message via the fallback protocol, send, to the node, a first request to register for the one or more services.

19. The UE of claim 13, wherein:
the request to register for the one or more services is a second request;
the computer-executable instructions, when executed by the processor, further cause the device to, prior to receiving the at least one of the MWI or the text message via the fallback protocol, send, to a first node of a first network, a first request to register for the one or more services; and
the node is a second node of a second network different than the first network.

20. The UE of claim 19, wherein:
the first network is a fifth Generation (5G) New Radio (NR) network; and
the second network is a fourth Generation (4G) Long Term Evolution (LTE) network.

* * * * *